US010983846B2

(12) United States Patent
Huang et al.

(10) Patent No.: US 10,983,846 B2
(45) Date of Patent: Apr. 20, 2021

(54) USER SPACE PRE-EMPTIVE REAL-TIME SCHEDULER

(71) Applicant: Futurewei Technologies, Inc., Plano, TX (US)

(72) Inventors: Mark Huang, San Jose, CA (US); Liangchen Zheng, Sunnyvale, CA (US)

(73) Assignee: Futurewei Technologies, Inc., Plano, TX (US)

( * ) Notice: Subject to any disclaimer, the term of this patent is extended or adjusted under 35 U.S.C. 154(b) by 203 days.

(21) Appl. No.: 15/977,893

(22) Filed: May 11, 2018

(65) Prior Publication Data

US 2019/0347129 A1    Nov. 14, 2019

(51) Int. Cl.
*G06F 9/54* (2006.01)
*G06F 9/48* (2006.01)

(52) U.S. Cl.
CPC ............ *G06F 9/545* (2013.01); *G06F 9/4812* (2013.01); *G06F 9/4881* (2013.01); *G06F 9/546* (2013.01)

(58) Field of Classification Search
CPC ...... G06F 9/4881; G06F 9/4812; G06F 9/545; G06F 9/546
See application file for complete search history.

(56) References Cited

U.S. PATENT DOCUMENTS 9,411,636 B1    8/2016  Ting et al.
9,843,550 B2 * 12/2017  Hosie ...................... H04L 51/26
2007/0101326 A1 *  5/2007  Cai ........................... G06F 9/545
                                                                  718/100
2013/0198758 A1 *  8/2013  Lim ....................... G06F 9/5038
                                                                  718/104
2015/0186059 A1 *  7/2015  Jibu ..................... G06F 11/0778
                                                                  711/162
2015/0301983 A1 * 10/2015  Vorbach ................ G06F 8/4441
                                                                  712/32
2019/0057045 A1 *  2/2019  Jiang ................... G06F 12/0811

FOREIGN PATENT DOCUMENTS

CN        101894045 A        11/2010
CN        106155730 A        11/2016

OTHER PUBLICATIONS

Demers, Alan, et al., "Analysis and Simulation of a Fair Queueing Algorithm", *Symposium Proceedings on Communications Architecture & Protocols (SIGCOMM '89)*, (1989), 1-12.

(Continued)

*Primary Examiner* — Jacob D Dascomb
(74) *Attorney, Agent, or Firm* — Schwegman Lundberg & Woessner, P.A.

(57) ABSTRACT

A computer implemented method includes executing a user space partition first real-time task from a real-time task queue on a real-time kernel thread executing on a computing core of a computer, wherein the real-time kernel thread is scheduled by an operating system scheduler, pre-empting the first real-time task via a user space partition real-time task scheduler in response to a task switch signal, saving a first real-time task context, loading a user space second real-time task context for use by the real-time kernel thread via the user space partition real-time task scheduler, and executing the second real-time task from the real-time task queue on the real-time kernel thread.

18 Claims, 8 Drawing Sheets

(56) References Cited

OTHER PUBLICATIONS

Deshpande, Neil, et al., "Analysis of the Go runtime scheduler", Columbia University. [online]. [archived on Dec. 22, 2012]. Retrieved from the Internet: <URL: https://web.archive.org/web/20121222073651/http://www.cs.columbia.edu/~aho/cs6998/reports/12-12-11_DeshpandeSponslerWeiss_GO.pdf>, (2012), 1-8.

Han, Sangjin, et al., "SoftNIC: A Software NIC to Augment Hardware", Technical Report No. UCB/EECS-2015-155, Electrical Engineering and Computer Sciences, University of California at Berkeley, (May 27, 2015), 1-15.

Kohler, Eddie, et al., "The Click Modular Router", ACM Transactions on Computer Systems, 18(3), (Aug. 2000), 263-297.

Mustafa, Mustafa El Gili, et al., "The Effect of Queuing Mechanisms First in First out (FIFO), Priority Queuing (PQ) and Weighted Fair Queuing (WFQ) on Network's Routers and Applications", *Wireless Sensor Network*, 8, (May 2016), 77-84.

Olivier, Stephen L., et al., "OpenMP task scheduling strategies for multicore NUMA systems", *The International Journal of High Performance Computer Applications*, 26(2), (2012), 110-124.

Waldspurger, Carl A., et al., "Lottery Scheduling: Flexible Proportional-Share Resource Management", *Proceedings of the 1st USENIX Conference on Operating Systems Design and Implementation (OSDI '94)*, Article No. 1, (1994), 11 pgs.

Waldspurger, Carl A., et al., "Stride Scheduling: Deterministic Proportional Share Resource Management", Technical Memorandum MIT/LCS/TM-528, MIT Laboratory for Computer Science, (Jun. 22, 1995), 1-23.

"International Application No. PCT/CN2019/085835, International Search Report and Written Opinion dated Aug. 7, 2019", (dated Aug. 7, 2019), 8 pgs.

Sarolahti, Pasi, "Real-Time Application Interface", Research Seminar on Real-Time Linux and Java, University of Helsinki, (Feb. 26, 2001), 11 pgs.

\* cited by examiner

USER SPACE PRE-EMPTIVE REAL-TIME SCHEDULER

TECHNICAL FIELD

The present disclosure is related to scheduling real-time tasks, and in particular to a user space real-time scheduler.

BACKGROUND

Many network applications utilize user space code to accomplish reactive programming with high parallelism. To accelerate the code, some systems bypass the kernel. User space runtimes may have a scheduler to schedule user space code, referred to, in the aggregate, as work load. The user space scheduler is usually just a façade around a kernel level scheduler. Since the user space scheduler is in user space, the capabilities of the user space scheduler are limited, and often kernel features are relied on, which can incur large context switching costs.

Some frameworks implement a lightweight task model by multiplexing one kernel thread into multiple running tasks. The drawback of method is that applications must work in a cooperative manner, sometimes requiring modification of each application by including program logic to avoid exceptions. Real-time sensitive application performance can be impacted by a lower priority task that is running or a busy task that prevents a real-time task from running.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer implemented method includes executing a user space partition first real-time task from a real-time task queue on a real-time kernel thread executing on a computing core of a computer, wherein the real-time kernel thread is scheduled by an operating system scheduler, pre-empting the first real-time task via a user space partition real-time task scheduler in response to a task switch signal, saving a first real-time task context, loading a user space second real-time task context for use by the real-time kernel thread via the user space partition real-time task scheduler, and executing the second real-time task from the real-time task queue on the real-time kernel thread.

Optionally, in any of the preceding aspects, a further implementation of the aspect includes wherein the first real-time task context and the second real-time task context comprise differences from a real-time kernel thread context. Optionally, in any of the preceding aspects, a further implementation of the aspect includes wherein the real-time task context differences comprise 15 or fewer register values managed by a real-time task scheduler executing on the computer.

Optionally, in any of the preceding aspects, a further implementation of the aspect includes wherein the real-time kernel thread is scheduled by an operating system scheduler for execution on the computing core, wherein the operating system scheduler handles switching kernel threads. Optionally, in any of the preceding aspects, a further implementation of the aspect includes wherein the computing core is dedicated to executing the real-time kernel thread. Optionally, in any of the preceding aspects, a further implementation of the aspect includes wherein execution of the first real-time task is interrupted by execution of the second real-time task due to the second real-time task having a higher priority.

Optionally, in any of the preceding aspects, a further implementation of the aspect includes wherein execution of the first real-time task is interrupted in response to an execution time threshold being met to allow switching to another real-time task in the real-time task queue.

Optionally, in any of the preceding aspects, a further implementation of the aspect includes wherein each real-time task is created with an associated priority. Optionally, in any of the preceding aspects, a further implementation of the aspect includes wherein each real-time task is created with an associated scheduling policy.

According to one aspect of the present disclosure a computer implemented method for preemptively scheduling real-time tasks in a user space partition of a core processor. The method includes queuing multiple real-time tasks in a real-time task queue in the user space partition, preempting a first user space partition real-time task being executed by a real-time task kernel thread executing on the core processor of the computer wherein the real-time task kernel thread is scheduled by an operating system scheduler, saving registers of the preempted first user space partition real-time task, and loading a second real-time task context for execution by the real-time task kernel thread executing on the core processor.

Optionally, in any of the preceding aspects, a further implementation of the aspect includes wherein the preempted first real-time task registers comprise a context of the first real-time task that comprises differences from a real-time task kernel thread context.

Optionally, in any of the preceding aspects, a further implementation of the aspect includes wherein real-time task context differences comprise 15 or fewer register values managed by a real-time task scheduler executing on the computer. Optionally, in any of the preceding aspects, a further implementation of the aspect includes wherein the real-time task kernel thread is scheduled by an operating system scheduler for execution on the core processor, wherein the operating system scheduler handles switching kernel threads.

Optionally, in any of the preceding aspects, a further implementation of the aspect includes wherein the core processor is dedicated to executing the real-time kernel thread. Optionally, in any of the preceding aspects, a further implementation of the aspect includes wherein the preempted first real-time task execution is interrupted by the new real-time task due to the second real-time task having a higher priority.

Optionally, in any of the preceding aspects, a further implementation of the aspect includes wherein each real-time task is created with an associated priority and an associated scheduling policy.

According to a further aspect of the present disclosure, a device includes memory storage comprising instructions and one or more processors in communication with the memory. The one or more processors execute the instructions to perform operations for preemptively scheduling real-time tasks in a user space partition of one or more core processors. The operations include queuing multiple real-time tasks in a real-time task queue in the user space partition, preempting a first user space partition real-time task being executed by a real-time task kernel thread executing on the core processor, wherein the real-time task kernel thread is scheduled by an operating system scheduler, saving registers of the preempted first user space partition real-time task, and loading a second real-time task context for execution by the real-time task kernel thread executing on the core processor.

Optionally, in any of the preceding aspects, a further implementation of the aspect includes wherein the one or more core processors are partitioned between real-time and non-real-time task workloads. Optionally, in any of the preceding aspects, a further implementation of the aspect includes wherein the preempted real-time task registers comprise a context of the first real-time task that comprises differences from a real-time task kernel thread context, and wherein the real-time task context differences comprise 15 or fewer register values managed by a real-time task scheduler executing on the core processor.

Optionally, in any of the preceding aspects, a further implementation of the aspect includes wherein the preempted real-time task execution is interrupted by the new real-time task due to the new real-time task having a higher priority and wherein each real-time task is created with an associated priority and an associated scheduling policy.

DETAILED DESCRIPTION

Figure 1:
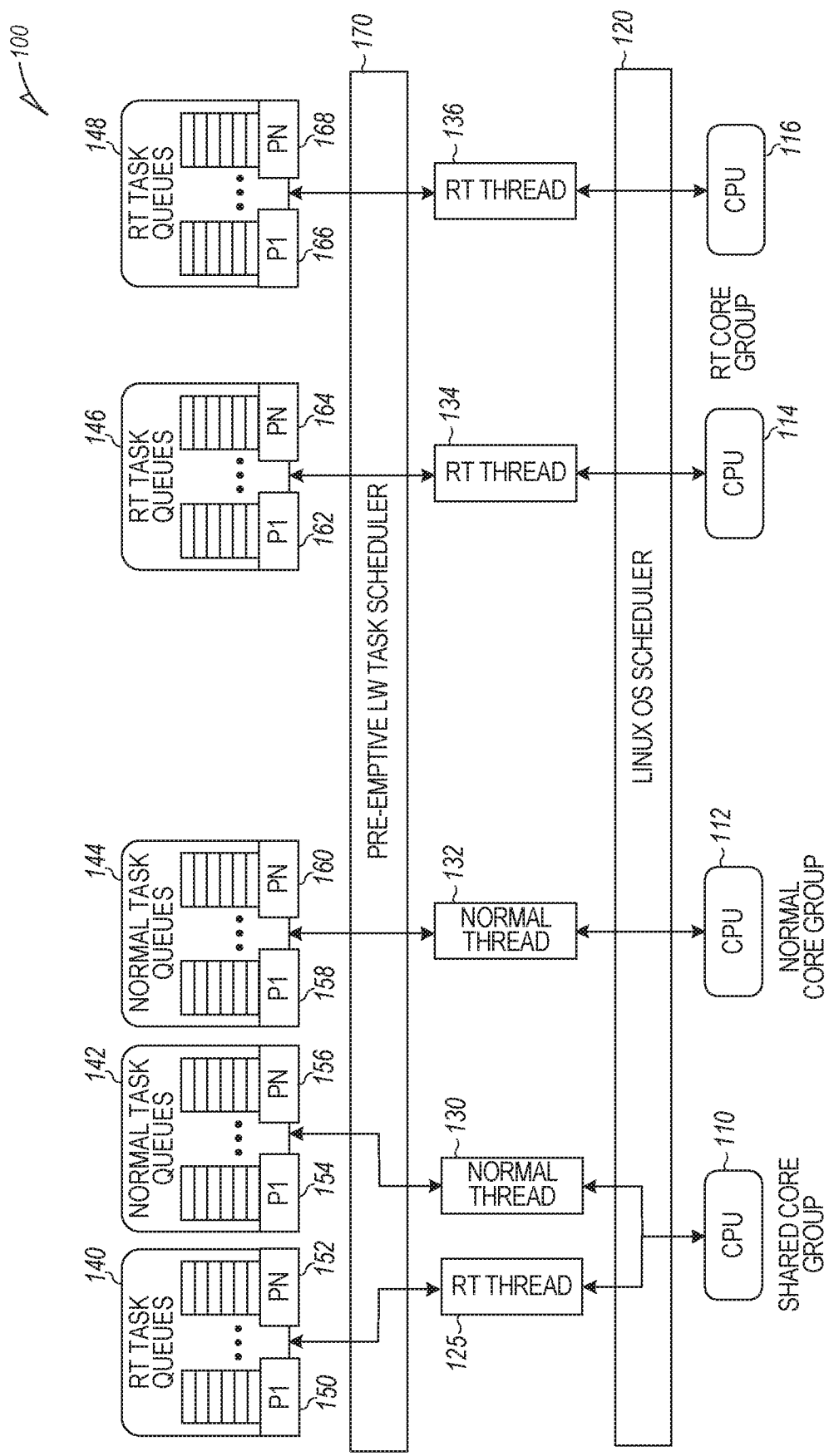
FIG. 1 is a block diagram of a system having four core central processing units and a lightweight (LW) real-time task scheduler in addition to a kernel thread scheduler according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may he executed on a digital signal processor, ASIC, microprocessor, or other type of processor operating on a computer system, such as a personal computer, server or other computer system, turning such computer system into a specifically programmed machine.

In many computer systems, memory may be divided into kernel space and user space. User space is a set of memory locations where user applications and processes run. The kernel manages the applications and keeps applications from interfering with each other. The kernel has access to all of memory. Applications in the user space access the kernel only via a limited set of system calls, which are then scheduled by a kernel scheduler to schedule execution of the applications from the user space.

Real-time tasks in the user space may involve interaction with a user, such as many different transactions. Transactions may involve a user's interaction with many different programs, from word processing, spreadsheet, browsers, and other programs. It can be important to generate fast responses to the user interactions. The scheduling of real-time tasks should be done in a manner to ensure service level agreements are satisfied and the user is satisfied with service, especially in network applications, in which computers may be providing services to multiple users.

To facilitate effective scheduling of real-time tasks, a user-space task scheduler preemptively schedules user-space tasks from a user-space task queue onto a user-space real-time thread that may be used for multiple user-space tasks without time consuming thread swapping. The real-time task thread is scheduled by a kernel scheduler to run on one of multiple CPU cores. The user-space task scheduler ensures that user-space task contexts, which are much smaller than thread contexts, may be efficiently swapped to provide service level agreement compliance.

The real-time user-space tasks are basically small functions that may be more easily switched. Their context, managed at the task scheduler level, may include the differences from the thread context as opposed to the entire context of the thread being saved and reloaded for each task switch. A thread context may be 2 Mbytes in size, compared to an example user-space task context of about 2 Kbytes. Thread context switching may utilize thousands of instruction cycles, while less than 100 instruction cycles may be used to switch the user-task context, saving significant computing resources.

FIG. 1 is a block diagram of a system 100 having four core central processing units (CPUs) 110, 112, 114, and 116. More or fewer cores may be used in further embodiments. Each core in an example embodiment may run an operating system having a scheduler 120 that schedules various threads that run on the CPUs. Thread 125 is a real-time (RT) thread that is used for running user space threads. RT threads may be referred to as real-time threads at least because there may be certain service level agreements (SLA) that specify how quickly RT tasks should complete. A normal thread 130 runs normal tasks that may not have an SLA. Both threads 125 and 130 are shown as running on CPU 110, and are scheduled by the scheduler 120. The scheduler 120 may be a Linux OS (operating system) scheduler in one embodiment.

CPU 112 is shown as running normal thread 132, CPU 114 is running RT thread 134, and CPU 116 is running RT thread 136. Note that in some embodiments, the RT threads may be pinned to a particular CPU to ensure that the RT thread is not switched out for a normal thread. Pinning is shown for CPUs 112, 114, and 116 where only one type of thread is running on the respective CPUs. Note that the threads are kernel threads, which may be thought of as heavy weight threads due to their relatively large contexts that are saved each time the scheduler 120 swaps, or changes which thread is running on their respective CPU.

In one embodiment, RT tasks may be selected to ensure that they are lightweight tasks, and have a user-space context of about 2 Kbytes or less, referred to as a user-space context constraint. Note that the user-space context constraint may be higher in further embodiments. The user-space context constraint for an RT task may be expressed as a percentage of a thread context, and may range from 5% to 15% or higher of a thread context in one embodiment. in further embodiments, the user-space context constraint may be a function of SLAs and the relative costs of context switching.

The threads are fed tasks from one or more queues, 140, 142, 144, 146, and 148. Queue 140 is an RT task queue that queues RT tasks for running on RT thread 125. Queue 142 is a normal task queue that queues normal tasks for running on thread 130. RT task queue 140 may have multiple priority queues as indicated at P1 150 to PN 152. Thus, there are N different priority levels for RT tasks, with a priority queue for each level. Similarly, normal task queues 142 and 144 also have a similar priority normal task queues as indicated at 154, 156 and 158, 160 respectively. RT task queues 146 and 148 have the same structure of multiple priority queues as indicated by priority queues 162, 164 and 166, 168 respectively. Scheduler 120 schedules normal tasks on normal threads from the normal tasks queues.

In one embodiment, system 100 includes a pre-emptive lightweight (LW) task scheduler 170, shown between the threads and the queues. The LW task schedule 170 is used to feed tasks from the RT queues to the RT threads, outside the control of the scheduler 120. LW task schedule 170 gives the user space the ability to select tasks to meet SLA commitments by both scheduling RT tasks separately from normal tasks, as well as preempting a currently running RT task by saving its LW context, suspending the currently running task. A different RT task may then be run on the same RT thread, such as an RT task having a higher priority. Once the higher priority task is complete, the preempted RT task may then be continued by loading the saved LW context into the RT thread.

In some embodiments, multi-core support may include both strict core partitioning and core sharing between real-time and non-real-time tasks. In strict core partitioning, one group of cores runs only RT threads and another group of cores runs only normal threads. In core sharing, one or more cores may each run RT threads and normal threads. The ability to support multiple cores in this manner provides for the ability to have fine grained CPU allocation based on RT and non-RT needs. In the shared core case, an RT thread can preempt a general thread to provide RT guarantees.

Figure 2:
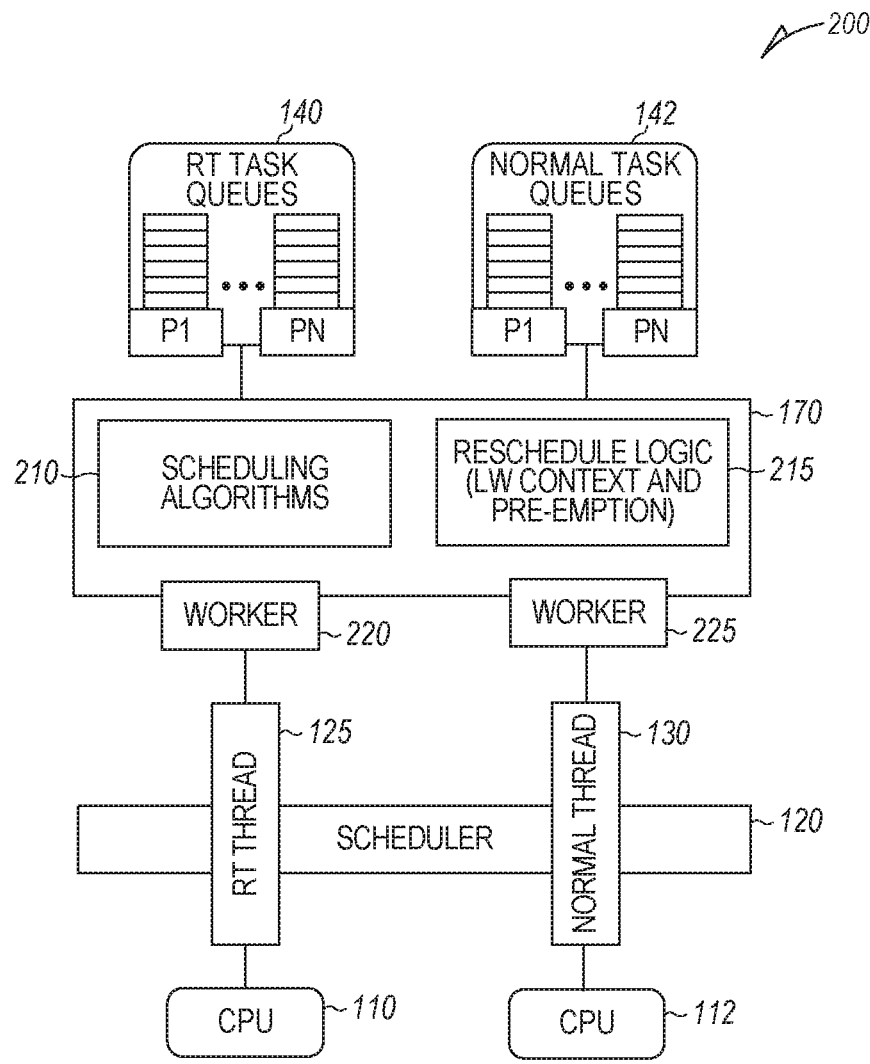
FIG. 2 is a block diagram of a system illustrating further detail of a pre-emptive LW task scheduler according to an example embodiment.

FIG. 2 is a block diagram of a system 200 illustrating further detail of pre-emptive LW task scheduler 170. The references numbers in FIG. 2 are consistent with those of FIG. 1 for like elements. LW task scheduler 170 has scheduling algorithms 210 and reschedule logic 215. Scheduling algorithms 210 select tasks from the RT task queues 140 and schedule the tasks via a worker thread 220 as RT thread 125. The worker thread 220 comprises user space code logic for performing LW pre-emptive user space scheduler 170 such that an execution context for the user-space tasks is provided. Worker thread 220 manages the light weight contexts of the user space tasks, providing a second level of scheduling over the scheduler 120 that schedules the threads 125 and 130. All code running on the CPUs is controlled by scheduler 120, with scheduling of LW tasks abstracted using LW task scheduler 170 via worker thread 220. Thus, scheduler 120 will schedule worker thread 220, whereas LW scheduler 170 schedules the LW tasks on worker thread 220.

When an RT task is preempted, the reschedule logic 215 takes over to copy the LW context and suspend the task. The reschedule logic 215 also restores the suspended task when the preempting task is complete. Normal tasks may be scheduled by the scheduler 120 from normal task queues 142 and executed via worker thread 225 as a normal thread 130.

Figure 3:
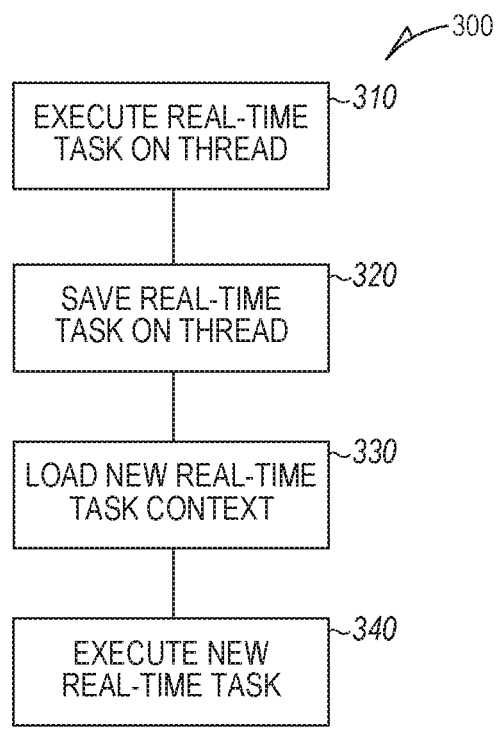
FIG. 3 is a flowchart illustrating a computer implemented method of switching real-time (RT) tasks via a preemptive scheduler according to an example embodiment.

FIG. 3 is a flowchart illustrating a computer implemented method 300 of switching RT tasks via a preemptive scheduler. Method 300 begins by executing a first real-time task from a real-time task queue on a real-time kernel thread executing on a computing core of the computer at operation 310. Operation 320 saves a first real-time task context responsive to a task switch signal. A second real-time task context is loaded at operation 330 for use by the real-time kernel thread. Operation 340 executes the second real-time task from the real-time task queue.

In one embodiment, the first real-time task context and the second real-time task context comprise differences from a real-time kernel thread context. The real-time task context differences may comprise 15 or fewer register values managed by a real-time task scheduler executing on the computer.

The real-time kernel thread may be scheduled by an operating system scheduler for execution on the computing core. The operating system scheduler handles switching kernel threads. The computing core is dedicated to executing the real-time kernel thread.

In one embodiment, the first real-time task execution may be interrupted by the second real-time task due to the second real-time task having a higher priority, which may be specified at creation. A scheduling policy may also be specified on creation of the real-time task. The first real-time task execution may he interrupted responsive to an execution time threshold being met to allow switching to another real-time task in the real-time task queue.

Figure 4:
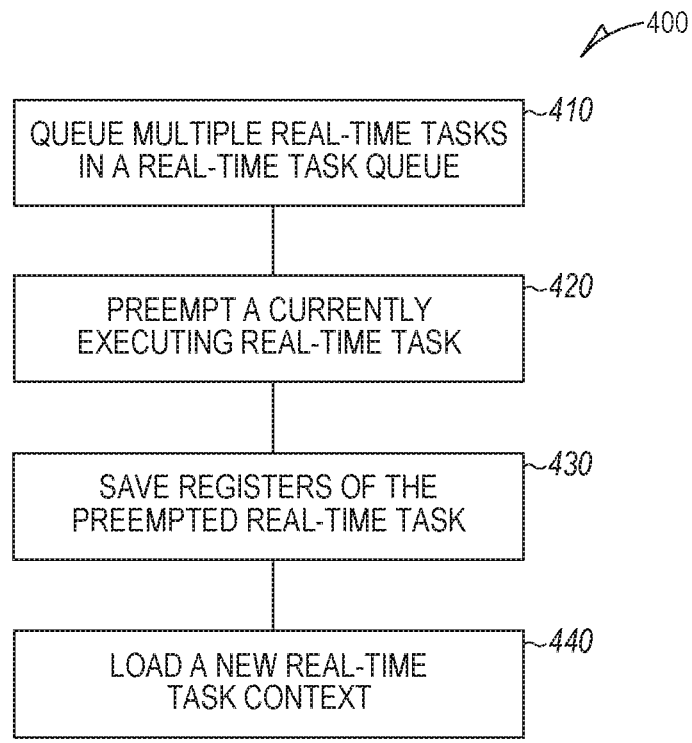
FIG. 4 is a flowchart illustrating a method for preemptively scheduling real-time tasks in a user space partition of a core processor executing an RT task kernel thread according to an example embodiment.

FIG. 4 is a flowchart illustrating a method 400 for preemptively scheduling real-time tasks in a user space partition of a core processor executing an RT task kernel thread. Multiple real-time tasks are queued in a real-time task queue at operation 410. At operation 420, a currently executing real-time task is preempted on a real-time task kernel thread executing in user space of the core processor of the computer. Registers of the preempted real-time task are saved at operation 430. Execution of the real-time task may be suspended and a new real-time task context is loaded at operation 440 for execution on the real-time task kernel thread executing in the user space partition of the core processor.

Figure 5:
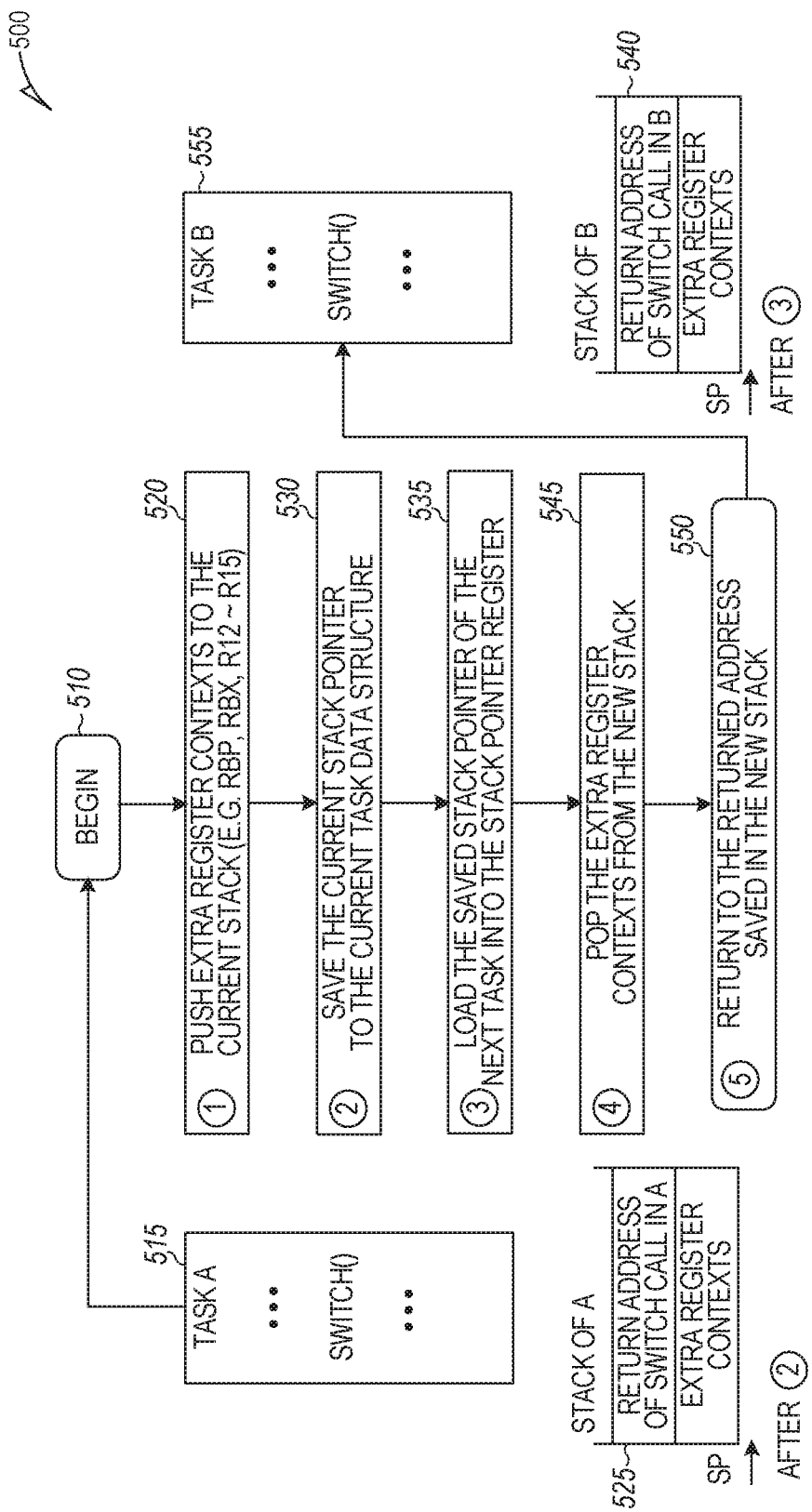
FIG. 5 is a block flow diagram illustrating a method of RT task scheduler context switching according to an example embodiment.

FIG. 5 is a block flow diagram illustrating a method 500 of RT task scheduler context switching. The RT task scheduler maintains data structures that store and restore task contexts. Operation begins at 510 with task A 515 executing on a RT thread. A switch indication is received, causing a push of extra register contexts at operation 520 to a current stack of A 525. Operation 530 saves the current stack pointer to the current task data structure. At operation 535, the saved stack pointer of the next task is saved into the stack pointer register. The extra register contexts from the new stack, stack of Bat 540, is popped at operation 545. Method 500 returns to the returned address saved in the new stack at operation 550, and the new task B 550 is executed by the RT thread.

Figure 6:
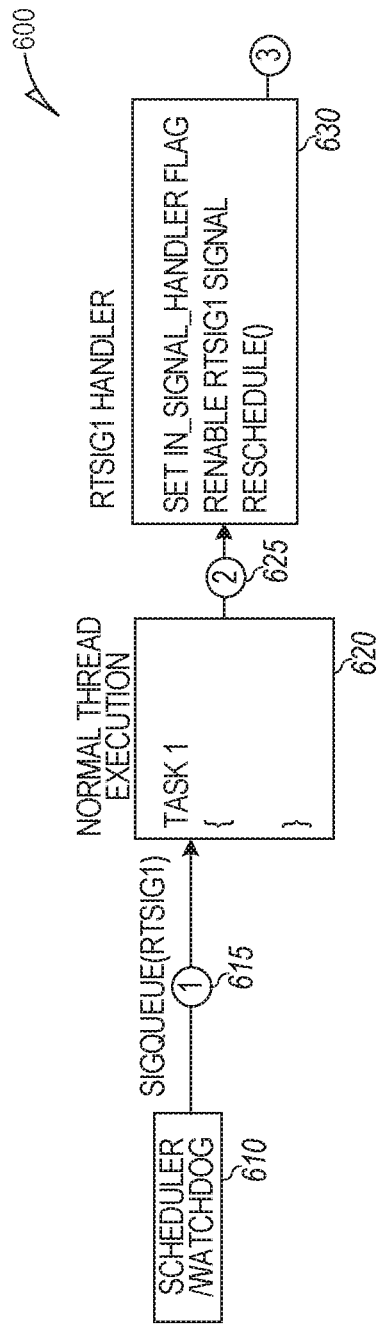
FIG. 6 is a block flow diagram illustrating a method of context switching via a signal according to an example embodiment.

FIG. 6 is a block flow diagram illustrating a method 600 of context switching via a signal, RTSIG1. A scheduler watchdog function 610 watches for a queue signal at 615, Sigqueue (RTSIG1), indicative of an RT task switch. The signal may be generated due to the need to execute a higher priority task first to satisfy obligations under an SLA in one embodiment, or for any other reason. Detection of the RTSIG1 signal while an RT task 1 620 is executing on a thread invokes an RTSIG1 handler 630, which sets a flag: In_signal_handler, and re-enables the RTSIG1 signal. A stack pointer in the. RTSIG1 handler 630 may be treated as the task 1 stack pointer. The RTSIG1 handler 630 saves the task 1 LW context and is suspended.

Figure 7:
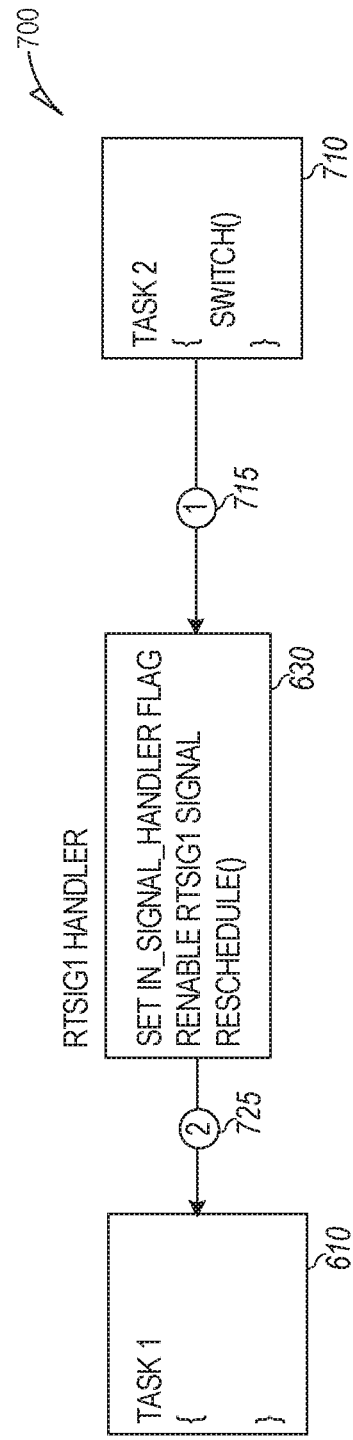
FIG. 7 is a block flow diagram illustrating a method of rescheduling a preempted task according to an example embodiment.

FIG. 7 is a block flow diagram illustrating a method 700 of rescheduling the preempted task 1 620. A task 2 710 is currently executing, and upon completion, and responsive to task 1 being picked to be. rescheduled/switched to, the task 1 context will be restored back to the suspended RTSIG1 handler 630, which will return at 725 to the task 1 620.

Figure 8:
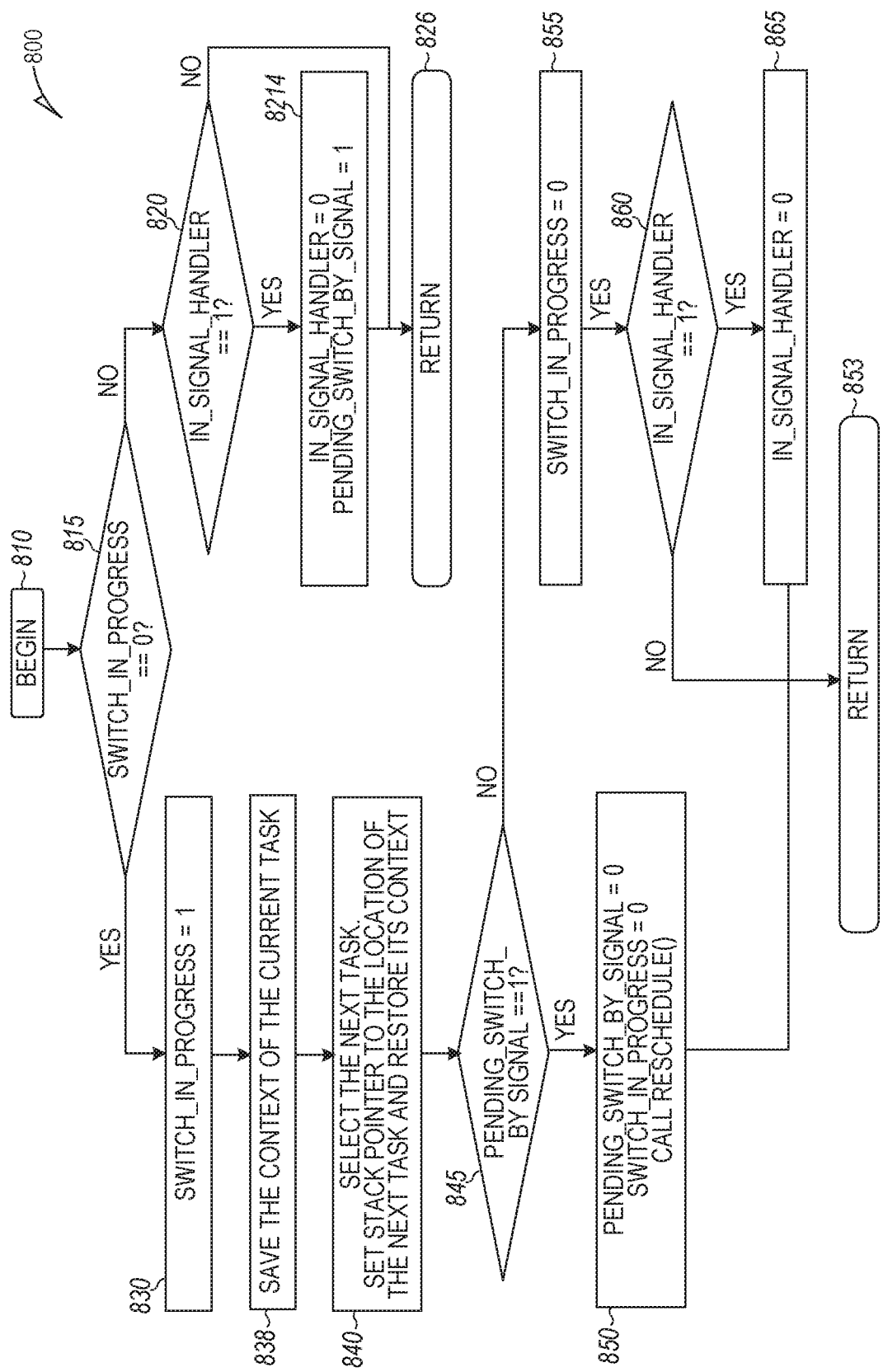
FIG. 8 is a flowchart illustrating a method of rescheduling a task with concurrency handling and reentrant support according to an example embodiment.

FIG. 8 is a flowchart illustrating a method 800 of rescheduling a task with concurrency handling and reentrant support. Method 800 starts at 810 and at operation 815 determines if a switch is in progress by detecting if a flag, Switch_in_progress, is zero. If not, it is determined at operation 820 if Switch_in_progress is 1. If yes, the In_signal_handler flag is set to zero and a Pending_switch_by_signal flag is set to 1. The flags act as a locking mechanism for a reschedule call between multiple LW tasks. Since CPU operations are atomic, no further locking mechanism is used in one embodiment. Method 800 then returns at 826. If no at operation 820, the method also returns at 826.

At operation 815, if the Switch_in_progress flag is zero, the Switch_in_progress flag is set to 1 at operation 830, the context of the current task is saved at operation 838, the next task is selected, the stack pointer is set to the location of the next task, and the next task's context is restored at operation 840. A determination of whether the Pending_switch_by_signal flag is equal to one is then made by operation 845. If yes, the Pending_switch_by_signal flag is set to zero, the Switch_in_progress flag is set to zero, and a reschedule function. Reschedule ( ) is called at operation 850. The method then returns at 853.

If, at 845, the Pending_switch by signal flag is not equal to one, the Switch_in_progress flag is set to zero at operation 855. At operation 860, it is determined if the In_signal_handler flag is 1. if no, the method returns at 853. If yes, the In_signal_handler flag is set to 0.

Application interfaces include the following:

Itw_task_t * Itwtask_create(void *(*task_func)(void *), Itw_sched_param sche_param) interface may be used to create a lightweight task with scheduling characteristics. Itw_task_t is a pointer, and Itwtask_create is the name of the interface. A lightweight task is a schedulable function implementing application logic. Void*(*task_func)(void*)—the pointer to the LW task code. Ltw_sched_param sche_param—scheduling parameters for the LW task such as priority, policy etc. The interface returns a Itw_task_t structure, which is the context of the LW task.

Itw_sched_param *get_Itw_sched_param(Itw_task_t *) interface is used to get scheduling parameters of a lightweight task. It may be thought of as a helper to simply retrieve the scheduling parameter for a given LW task int set_Itw_sched_param(Itw_task_t *, Itw_sched_param *) interface may be used to set scheduling parameters of a lightweight task, such as scheduling policy. Given a LW task t, the interface sets its scheduling parameter. The interface can be used to change scheduling characteristics.

Itw_sched_init(core_list_t * CPU_group_list, bool preemptive) interface is used to initialize the scheduler—allocates CPU cores based on group list and set the preemptive flag. Scheduler initialization—core_list_t* CPU_group_list—a set of CPU cores the scheduler will use for LW tasks. Bool preemptive allows or disallows LW task preemption Scheduling interfaces may include the following:

void reschedule(void) Invoked by a lightweight task to yield CPU.

void reschedsignal(int workID) Trigger a reschedule of a lightweight task by an external system. This mechanism causes a running task to be interrupted and yield its execution so that the scheduler can schedule the next task void reschedsignalonfault(int workID) Trigger a reschedule of a lightweight task by an external system when the current task is in an exception state (e.g.: time threshold reached). The scheduler will put the current task into a faulty task queue and schedule the next proper task.

Figure 9:
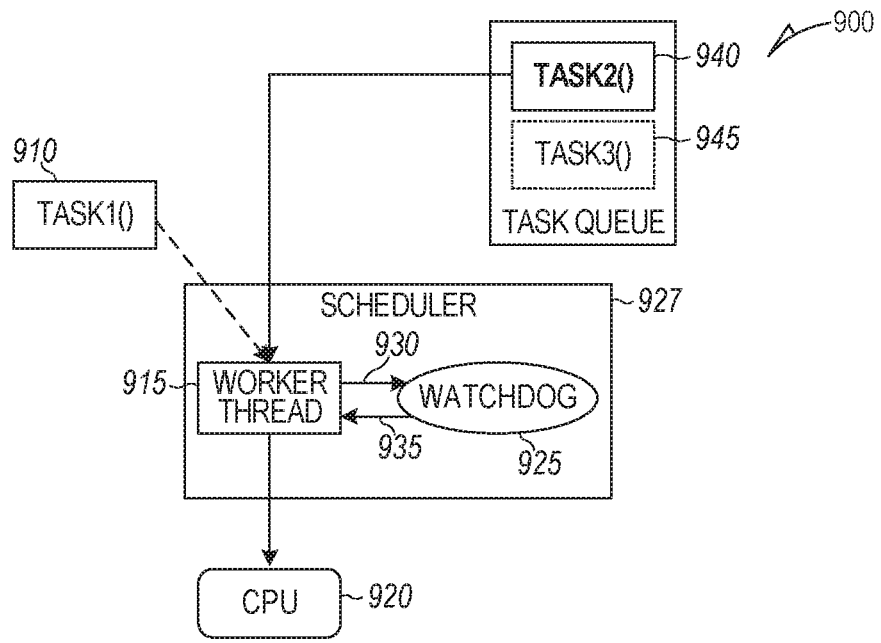
FIG. 9 is a block flow diagram illustrating a method of exception handling according to an example embodiment.

FIG. 9 is a block flow diagram illustrating a method 900 of exception handling. In one embodiment, a task 1 ( ) at 910 is being performed by a worker thread 915, such as an RT thread that is executing on a CPU 920. A watchdog function 925 in scheduler 927 checks the state of task 1 ( ) periodically as indicated at 930 to determine if the task has exceeded an execution time quantum or threshold. If so, an exception has been detected, and the watchdog 925 a function (reschedsignalonfault(workID)) to signal at 935 the worker thread, giving the function a workID. A signal to the worker thread 915 is then sent to cause task 1( ) 910 to stop and be placed in a faulty queue by a worker signal handler. The next task 2( )at 940 from the task queue 945 is rescheduled via reschedule( ). Task 2( )will then resume execution.

Figure 10:
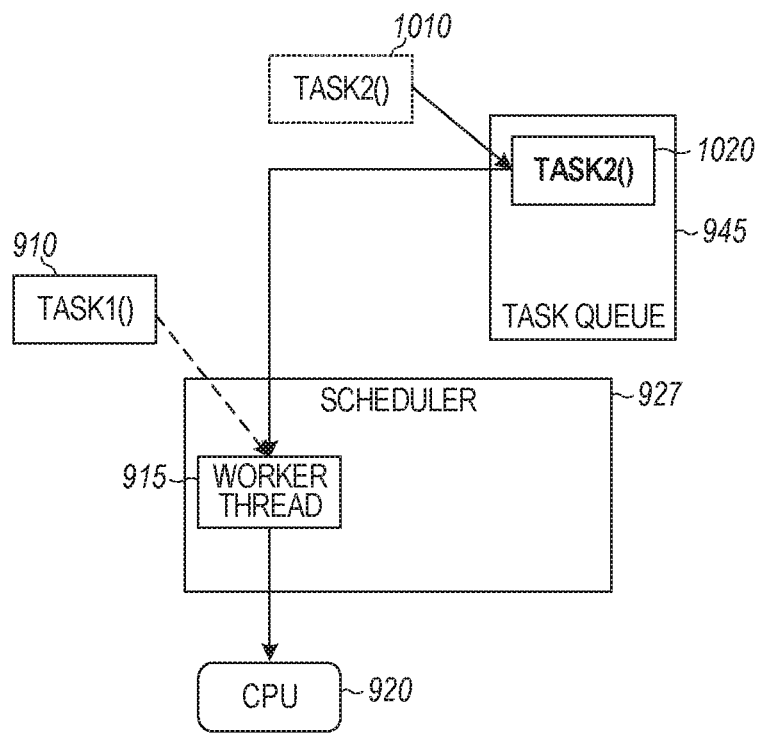
FIG. 10 is a block flow diagram illustrating a method of task preemption caused by a new RT task according to an example embodiment.

FIG. 10 is a block flow diagram illustrating a method 1000 of task preemption caused by a new RT task. Reference numbers on like components are the same as those used in FIG. 9. In one embodiment, a task 1( ) at 910 is being performed by a worker thread 915, such as an RT thread that is executing on a CPU 920. A new RT task, task 20 1010 is created while task 1( ) is still running. A call to Itwtask_create( ) places task 2( )into the proper queue 945 as indicated at 1020. A call is then made to reschedsignal(int workID) while will interrupt the worker thread 915 and jump to a signal handler. The signal handler calls reschedule( ) and runs the new RT task, task 2( ).

Figure 11:
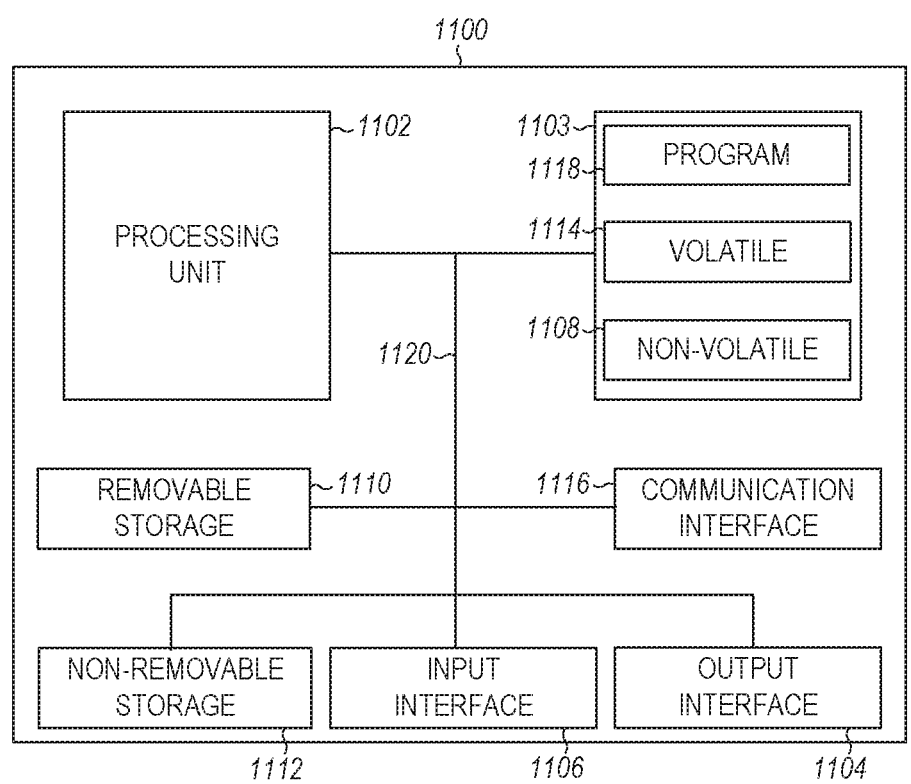
FIG. 11 is a block diagram illustrating circuitry for clients, servers, cloud based resources for implementing algorithms and performing methods according to example embodiments.

FIG. 11 is a block diagram illustrating circuitry for implementing a real-time scheduler for real time tasks and for performing methods according to example embodiments. All components need not be used in various embodiments.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, or other computing device including the same or similar elements as illustrated and described with regard to FIG. 11. Devices, such as smartphones, tablets, and smartwatches, are generally collectively referred to as mobile devices or user equipment. Further, although the various data storage elements are illustrated as part of the computer 1100, the storage may also or alternatively include cloud-based storage accessible via a network, such as the Internet or server based storage.

Processing unit 1102 may include multiple core processors in one embodiment executing an operating system that includes a kernel thread scheduler. Memory 1103 may include volatile memory 1114 and non-volatile memory 1108. Computer 1100 may include—or have access to a computing environment that includes a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 11.00 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, WiFi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software that, when executed by the processing unit 1102, performs network switch operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 may be used to cause processing unit 1102 to perform one or more methods or algorithms described herein.

Various embodiments provide for core partitioning between real-time and non-real-time workloads. Two levels of scheduling that multiple kernel thread context into multiple lightweight user space task context and allow user space preemption of lightweight tasks provides a flexible user space real-time scheduler design that ensure the ability to meet service level agreement response commitments for real-time tasks without having to modify an operating system kernel thread scheduler.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer implemented method comprising:
   executing a user space partition first real-time task from a real-time task queue on a real-time kernel thread executing on a computing core of a computer, the first real-time task having a service level agreement, the real-time kernel thread being scheduled by an operating system scheduler;
   pre-empting the first real-time task via a user space partition real-time task scheduler in response to a task switch signal;
   saving a first real-time task context;
   loading a user space second real-time task context for use by the real-time kernel thread via the user space partition real-time task scheduler; and
   executing a second real-time task from the real-time task queue on the real-time kernel thread, the operating system scheduler handling switching a kernel thread between the real-time kernel thread executing tasks having the service level agreement and a normal kernel thread executing tasks that do not have a service level agreement.

2. The method of claim 1 wherein the first real-time task context and the second real-time task context comprise real-time task context differences from a real-time kernel thread context.

3. The method of claim 2 wherein the real-time task context differences comprise 15 or fewer register values managed by the user space partition real-time task scheduler executing on the computer.

4. The method of claim 1 wherein the computing core is dedicated to executing the real-time kernel thread.

5. The method of claim 1 wherein execution of the first real-time task is pre-empted by execution of the second real-time task due to the second real-time task having a higher priority.

6. The method of claim 1 wherein execution of the first real-time task is pre-empted in response to an execution time threshold being met to allow switching to another real-time task in the real-time task queue.

7. The method of claim 1 wherein each real-time task is created with an associated priority.

8. The method of claim 1 wherein each real-time task is created with an associated scheduling policy.

9. A computer implemented method for preemptively scheduling real-time tasks in a user space partition of a core processor, the method comprising:

queuing multiple real-time tasks in a real-time task queue in the user space partition;

preempting a first user space partition real-time task being executed by a real-time kernel thread executing on the core processor of the computer, the real-time kernel thread being scheduled by an operating system scheduler;

saving registers of the preempted first user space partition real-time task; and loading a second real-time task context for execution by the real-time kernel thread executing on the core processor, the operating system scheduler handling switching kernel threads between the real-time kernel thread executing tasks having a service level agreement and a normal kernel thread executing tasks that do not have a service level agreement.

10. The method of claim 9 wherein the preempted first real-time task registers comprise a first real-time task context and wherein the first real-time task comprises real-time task context differences from a real-time task kernel thread context.

11. The method of claim 10 wherein the real-time task context differences comprise 15 or fewer register values managed by a real-time task scheduler executing on the computer.

12. The method of claim 9 wherein the core processor is dedicated to executing the real-time kernel thread.

13. The method of claim 9 wherein the preempted first real-time task execution is interrupted by the second real-time task due to the second real-time task having a higher priority.

14. The method of claim 9 wherein each real-time task is created with an associated priority and an associated scheduling policy.

15. A device comprising:

memory storage comprising instructions; and one or more core processors in communication with the memory, wherein the one or more core processors execute the instructions to perform operations for preemptively scheduling real-time tasks in a user space partition of the one or more core processors, comprising:

queuing multiple real-time tasks in a real-time task queue in the user space partition;

preempting a first user space partition real-time task being executed by a real-time kernel thread executing on a core processor, the real-time kernel thread being scheduled by an operating system scheduler;

saving registers of the preempted first user space partition real-time task; and loading a second real-time task context for execution by the real-time kernel thread executing on the core processor, the operating system scheduler handling switching kernel threads between the real-time kernel thread executing tasks having a service level agreement and a normal kernel thread executing tasks that do not have a service level agreement.

16. The device of claim 15 wherein the one or more core processors are partitioned between real-time and non-real-time task workloads.

17. The device of claim 15 wherein the preempted real-time task registers comprise a context of the first real-time task that comprises differences from a real-time task kernel thread context, and wherein the real-time task context differences comprise 15 or fewer register values managed by a real-time task scheduler executing on the core processor.

18. The device of claim 15 wherein the preempted real-time task execution is interrupted by the second real-time task due to the second real-time task having a higher priority and wherein each real-time task is created with an associated priority and an associated scheduling policy.

* * * * *